Feb. 14, 1956  R. E. PAYNE  2,734,736
AUTOMATIC WEIGHING SCALE
Filed March 20, 1952  2 Sheets-Sheet 1
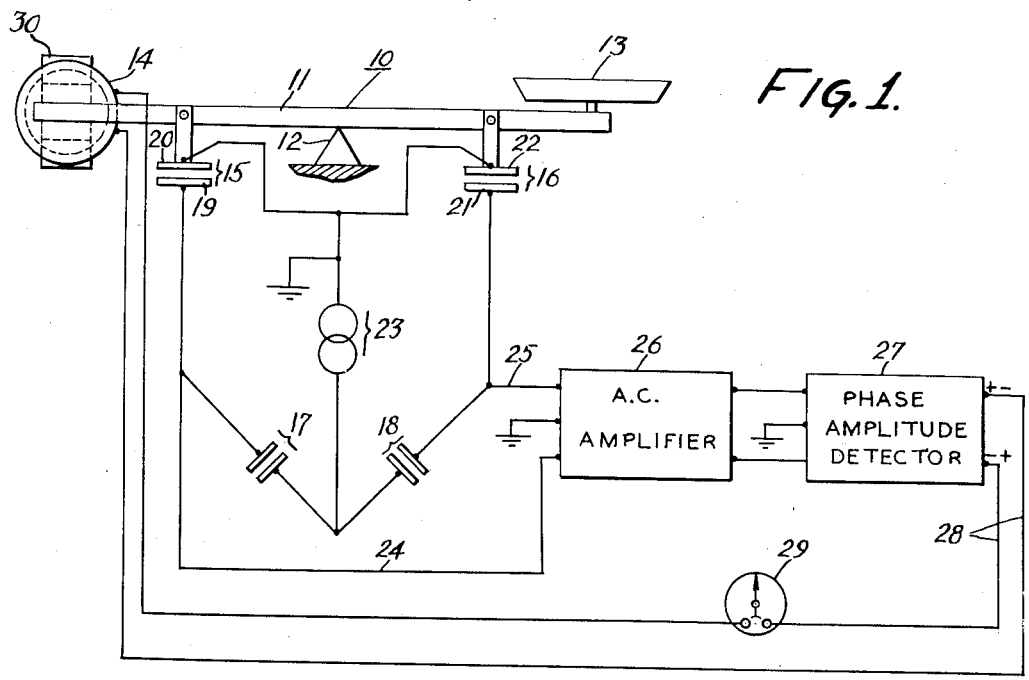
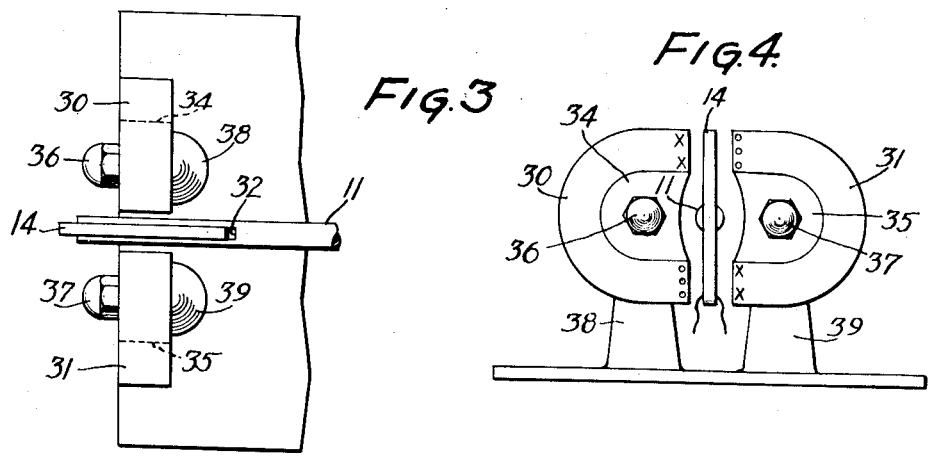
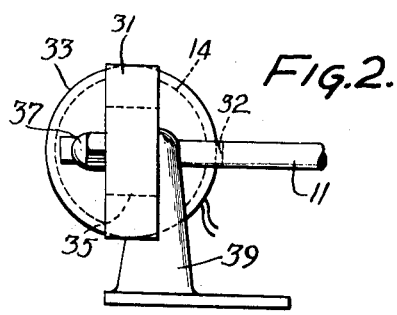
Inventor:
Robert E. Payne
by his Attorney
Hugo G. Kenman

SWITCHING OR REFERENCE VOLTAGE SOURCE

Inventor:
Robert E Payne
by his Attorney
Hugo A Kenman

United States Patent Office 2,734,736
Patented Feb. 14, 1956

2,734,736
AUTOMATIC WEIGHING SCALE

Robert E. Payne, Gladwyne, Pa., assignor to The Sharples Corporation, a corporation of Delaware Application March 20, 1952, Serial No. 277,581

2 Claims. (Cl. 265—70)

This invention relates to systems for measuring varying forces, especially where minute forces are involved and great sensitivity and accuracy are required. The invention is particularly applicable to apparatus for analyzing powdered or finely divided material by determining its particle size distribution, as disclosed in my copending application Serial No. 768,907, filed August 15, 1947, now U. S. Patent No. 2,597,899, dated May 27, 1952, of which the present application is a continuation-in-part.

The principal object of the present invention is to provide an improved force measuring system which is extremely sensitive to applied forces and which is capable of accurately measuring very small forces.

Another object of the invention is to provide such a system which operates by differential variation of the capacitances of a pair of electrical capacitors to produce a substantial electrical effect in response to an applied force.

By way of example, the invention is illustrated in the accompanying drawing as applied to a weighing device such as would be used in an apparatus for determination of particle size distribution of finely divided material, as disclosed in the aforementioned patent. As applied to such apparatus, the present invention serves to measure the varying force produced by material particles settling through a sedimentation tower onto the collecting pan of the fulcrumed balance member. It is to be understood, however, that the invention is not limited to such application but may be used generally for measurement of forces wherever it is applicable.

In the accompanying drawings:

Fig. 1 is a diagrammatic illustration of a system constructed and arranged according to the invention;

Fig. 2 is a fragmentary side elevational view showing the restoring coil arrangement associated with the balance member;

Fig. 3 is a fragmentary plan view of the same;

Fig. 4 is an end elevational view of the same structure;

Figure 5:
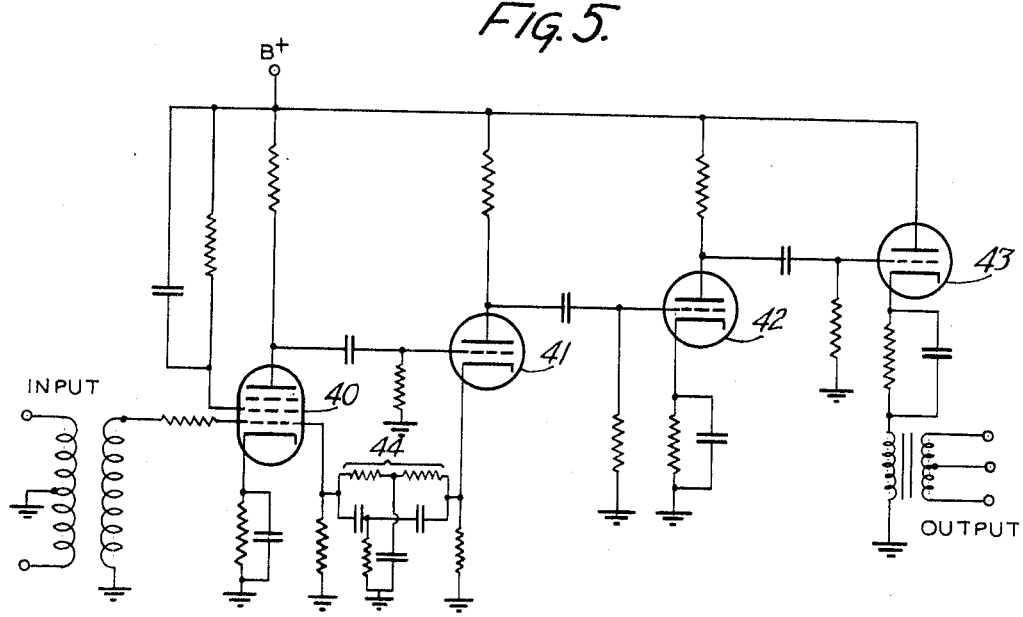
Fig. 5 is a diagrammatic illustration of an amplifier which may be used in the system of Fig. 1.

Referring first to Fig. 1 of the drawings, there is represented a weighing scale assembly 10 comprising a balance member 11 pivoted at the fulcrum 12 and carrying a collecting pan 13 at one end and a restoring coil 14 at the other end. The fulcrum 12, which is shown only diagrammatically may be of the type shown in the above-mentioned patent comprising a torsion wire. The system provided by the present invention responds to movement of the lever arm 11 and applies a restoring force to said lever through the restoring coil 14, and at the same time indicates the magnitude and sense of the restoring force as a measure of the force which produced the movement of the lever arm 11. In practice, the movement of the lever arm 11 may be very small, as will be the case where the system is used in apparatus of the character above-mentioned where the weight of material particles settling on the collecting pan 13 produces the movement of the lever arm 11. However, the system is extremely sensitive and is capable of responding to such small movement of the lever arm 11 in response to slight variation of force applied thereto.

In accordance with the invention there are associated with the lever arm 11 two capacitors 15 and 16 which are connected as shown in a balance-type electrical network or bridge which also includes capacitors 17 and 18. Capacitor 15 has a fixed plate 19 and a movable plate 20 which is connected to the lever arm 11 on one side of the fulcrum so as to be movable by the arm 11. Similarly, capacitor 16 has a fixed plate 21 and a movable plate 22 which is connected to lever arm 11 on the other side of the fulcrum for movement by said arm. Thus movement of arm 11 causes differential variation of the capacitance of capacitors 15 and 16. Capacitors 17 and 18 may be manually adjustable to enable accurate balancing of the network or bridge when the lever arm 11 is in its equilibrium position. Pates 20 and 22 are connected together and to a grounded terminal of an alternating voltage source 23. Plates 19 and 21 are connected respectively to the capacitors 17 and 18 which are also connected to the voltage source 23. The source 23 is preferably of high frequency for suitable use with the capacitor bridge circuit.

The arrangement of the capacitors 15 and 16 in Fig. 1 is merely for illustrative purposes. In practice, any suitable arrangement may be employed. For example, rotary condensers, similar to radio tuning condensers, may be employed, in which case the rotors of the condensers would be arranged for rotation with arm 11 about the fulcrum axis. Of course, the arrangement should be such that the capacitances of the two condensers are varied differentially by rotary movement of the arm about the fulcrum axis.

The output of the capacitor bridge is taken over conductors 24 and 25 and is applied to the input of a suitable amplifier 26. In the balanced condition of the controlling network, the voltages on conductors 24 and 25 with respect to ground are equal and of like phase, and these voltages effectively cancel one another at the input of the amplifier 26. Thus, when the lever arm 11 is in its equilibrium position, there is no output supplied by the control system to the restoring coil 14. However, when the controlling network becomes unbalanced due to movement of lever arm 11 from its equilibrium position, the voltages on conductors 24 and 25 with respect to ground become unbalanced as to amplitude to an extent dependent upon the degree of unbalance. Thus, the two voltages are differentially varied in amplitude in response to movement of the lever arm 11 from its equilibrium position. The unbalance of the two voltages produces a resultant difference voltage whose phase is dependent upon the direction of unbalance, i. e. the direction of movement of lever arm 11 from its equilibrium position. The amplifier 26 amplifies the difference voltage, and the detector 27 detects the phase of the amplified voltage and produces a D. C. voltage across conductors 28 of a polarity dependent upon the phase of said difference voltage and of a magnitude dependent upon the magnitude of said difference voltage. The D. C. output from the phase amplitude detector 27 is supplied to the restoring coil 14 over conductors 28. An indicating meter 29, which may be a microammeter, is included in circuit with the coil 14 so as to indicate the restoring force in terms of the current supplied to the coil 14.

As may be seen in Figs. 2 to 4, the restoring coil 14 is positioned with its axis in an approximate horizontal plane and its coil faces between the opposed and opposite polarity pole faces of a pair of permanent magnets 30 and 31. As may be seen in Fig. 3, the end of lever arm 11 may be slotted as at 32 to receive the coil 14 and its supporting form member. The coil may be constructed in any suitable fashion, and in the preferred embodiment the coil is wound within a peripheral slot of a plastic disk 33 (see Fig. 2) forming the coil support form. A thin disk of aluminum may be applied to one side of the coil to effect a damping action or the coil for mitself may be formed of aluminum. The permanent magnets 30 and 31 are mounted as shown, with their opposed pole faces of opposite polarity and with the coil 14 therebetween. The magnets may be supported in any suitable manner, such as by the plastic inserts 34 and 35 having centrally located bores through which bolts 36 and 37 extend into engagement with pedestal supporting members 38 and 39. The leads extending from the coil may be very fine diameter wires.

In operation of the system, any movement of the lever arm 11 from its equilibrium position causes differential variation of the capacitances of the capacitors 15 and 16, and even though the movement of the lever arm 11 may be very small, the differential action produces an appreciable unbalance of the network or bridge, thus producing a useable output which may be amplified and detected to supply sufficient current to the coil 14 to restore the equilibrium position of the lever arm 11.

The amplifier 26 and the detector 27 may be of any suitable form and may be conventional devices. Preferably, however, they are of the form shown in Figs. 5 and 6.

Fig. 5 shows an amplifier comprising four cascaded vacuum tube stages 40 to 43, and also comprising a feedback circuit including a double T filter network 44. This network passes all frequencies except those within a narrow band, so that the gain of the amplifier is high at frequencies in that band but is low at frequencies outside the band. Thus the amplifier has a narrow band pass characteristic.

Figure 6:
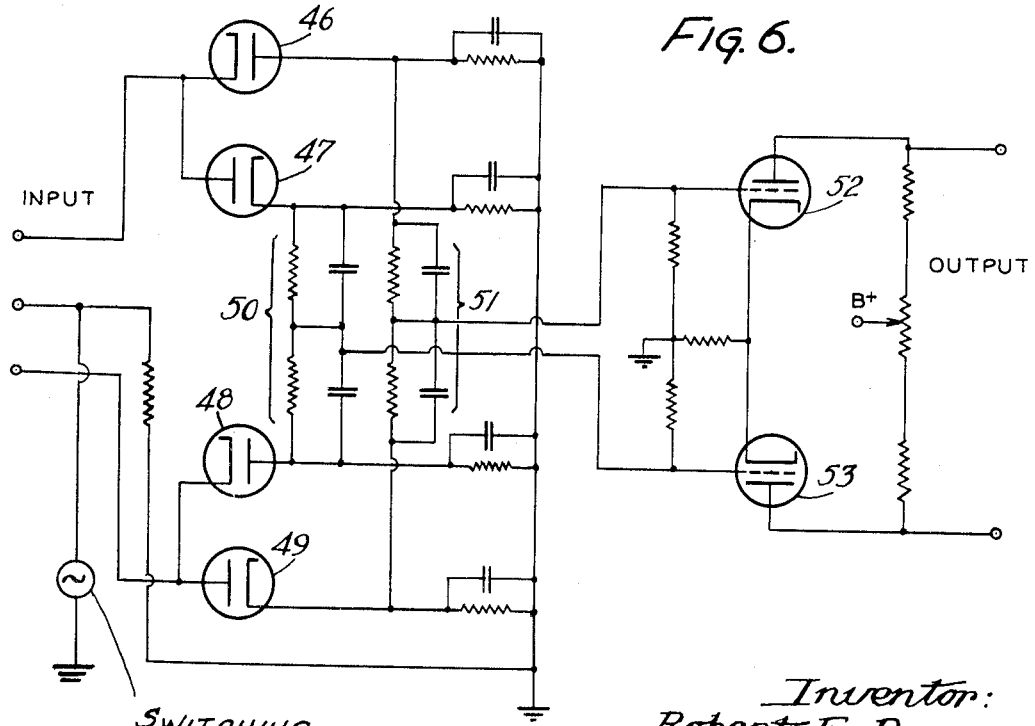
Fig. 6 is a diagrammatic illustration of a detector which may be used in the system of Fig. 1.

Fig. 6 shows a balanced phase-sensitive detector which comprises diodes 46 to 49 and associated bridged T networks 50 and 51 from which voltages are derived and applied to triodes 52 and 53.

While the invention has been described with reference to the particular embodiment illustrated, it is not limited thereto but contemplates such modifications and other embodiments as may occur to those skilled in the art.

I claim:

1. Apparatus for measuring extremely small forces quickly and with a high degree of accuracy, comprising a balance member and a substantially frictionless fulcrum mounting therefor, said member being adapted to be actuated by very small forces applied thereto at one side of its fulcrum, a four-arm electrical network having a pair of variable capacitors included respectively in two arms of the network and connected to said balance member at opposite sides of its fulcrum to be varied differentially by movement of the balance member about its fulcrum, said network being electrically balanced when the balance member is in its equilibrium position, a source of alternating voltage connected across two diagonal points of said network and having one side grounded, an impedance connected across the other two diagonal points of said network and having its midpoint grounded, whereby a balanced condition of said network produces equal opposing alternating voltages of like phase across the two halves of said impedance, and an unbalanced condition of said network causes unbalance of said voltages and produces a resultant difference voltage of magnitude and phase dependent upon the extent and direction of movement of said balance member from its equilibrium position, means to produce from said difference voltage a unidirectional voltage of a magnitude and polarity dependent upon the amplitude and phase of said difference voltage, restoring means operable upon said balance member at the side of its fulcrum opposite the side at which the forces to be measured are applied, said restoring means comprising a coil and magnet structure cooperatively associated with said coil to produce reactive force on the balance member upon flow of current in said coil, electrical connections for applying said unidirectional voltage to said coil to produce unidirectional current therein of polarity and magnitude according to the direction and magnitude of movement of the balance member from its equilibrium position, thereby to effect restoration of the balance member to its equilibrium position, and electrically-operable indicating means connected to said electrical connections to give an indication representative of force being measured.

2. Apparatus according to claim 1, including an amplifier whereof said impedance is the input element, and a phase-amplitude detector connected to said amplifier and serving to produce said unidirectional voltage.

References Cited in the file of this patent

UNITED STATES PATENTS

| | | |
|---|---|---|
| 2,155,419 | Gunn | Apr. 25, 1939 |
| 2,371,040 | Fisher | Mar. 6, 1945 |
| 2,598,812 | Marco | June 3, 1952 |